United States Patent
Tsirkin

(10) Patent No.: US 11,567,866 B2
(45) Date of Patent: Jan. 31, 2023

(54) FREE DETECTION WITH DOUBLE FREE PROTECTION

(71) Applicant: Red Hat, Inc., Raleigh, NC (US)

(72) Inventor: Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/001,210

(22) Filed: Aug. 24, 2020

(65) Prior Publication Data

US 2022/0058119 A1    Feb. 24, 2022

(51) Int. Cl.
  *G06F 12/06*    (2006.01)
  *G06F 12/10*    (2016.01)

(52) U.S. Cl.
  CPC .......... *G06F 12/0646* (2013.01); *G06F 12/10* (2013.01); *G06F 2212/1008* (2013.01)

(58) Field of Classification Search
  None
  See application file for complete search history.

(56) References Cited

U.S. PATENT DOCUMENTS

| | | | |
|---|---|---|---|
| 8,510,596 B1* | 8/2013 | Gupta | G06F 11/1004 714/21 |
| 2009/0100143 A1* | 4/2009 | Nakayama | H04L 12/423 709/251 |
| 2016/0092702 A1* | 3/2016 | Durham | G06F 9/35 713/190 |
| 2017/0177429 A1* | 6/2017 | Stark | G06F 21/60 |
| 2019/0129786 A1* | 5/2019 | Liu | G06F 11/0751 |
| 2019/0227951 A1* | 7/2019 | Durham | G06F 21/79 |
| 2019/0369903 A1* | 12/2019 | Tsirkin | G06F 12/1036 |
| 2020/0201997 A1* | 6/2020 | Liu | G06F 21/52 |
| 2021/0200546 A1* | 7/2021 | Lemay | G06F 12/1475 |
| 2021/0240638 A1* | 8/2021 | Deutsch | H04L 9/0894 |

OTHER PUBLICATIONS

Lee, B et al., "Preventing Use-after-free with Dangling Pointers Nullification ", 2015, 15 pages.
Novark, G et al., "DieHarder: Securing the Heap", 2010, 15 pages.
Chen, Gang et al., "On-Demand Proactive Defense against Memory Vulnerabilities" 2017, 13 pages.

* cited by examiner

*Primary Examiner* — Tracy C Chan
(74) *Attorney, Agent, or Firm* — Lowenstein Sandler LLP

(57) ABSTRACT

The technology disclosed herein may detect, avoid, or protect against "use after free" or "double free" programing logic errors. An example method may involve: receiving a plurality of requests to allocate memory, the plurality of requests comprising a first request and a second request; identifying a chunk of memory; generating a plurality of pointers to the chunk of memory, the plurality of pointers comprising a first pointer and a second pointer; providing the first pointer responsive to the first request and the second pointer responsive to the second request; and updating pointer validation data after providing the second pointer, wherein the pointer validation data indicates at least one of the plurality of pointers is valid and at least one of the plurality of pointers is invalid.

20 Claims, 8 Drawing Sheets

FREE DETECTION WITH DOUBLE FREE PROTECTION

TECHNICAL FIELD

The present disclosure is generally related to memory management in computer systems, and more particularly, to minimizing logic errors when performing memory allocation and deallocation.

BACKGROUND

Most modern computer systems include memory management features that enable programs to dynamically request memory during runtime. The program may use the memory for storing data and the amount of memory used by a program may change over time. The program may submit requests for additional memory and requests to release memory and a memory manager may respond by performing memory allocation and deallocation respectively. Memory allocation may involve identifying available memory and enabling the memory to be used by the program. Memory deallocation may involve releasing previously used memory so that it can be subsequently reused. The memory manager may handle repeated requests for memory allocation and deallocation for multiple processes.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
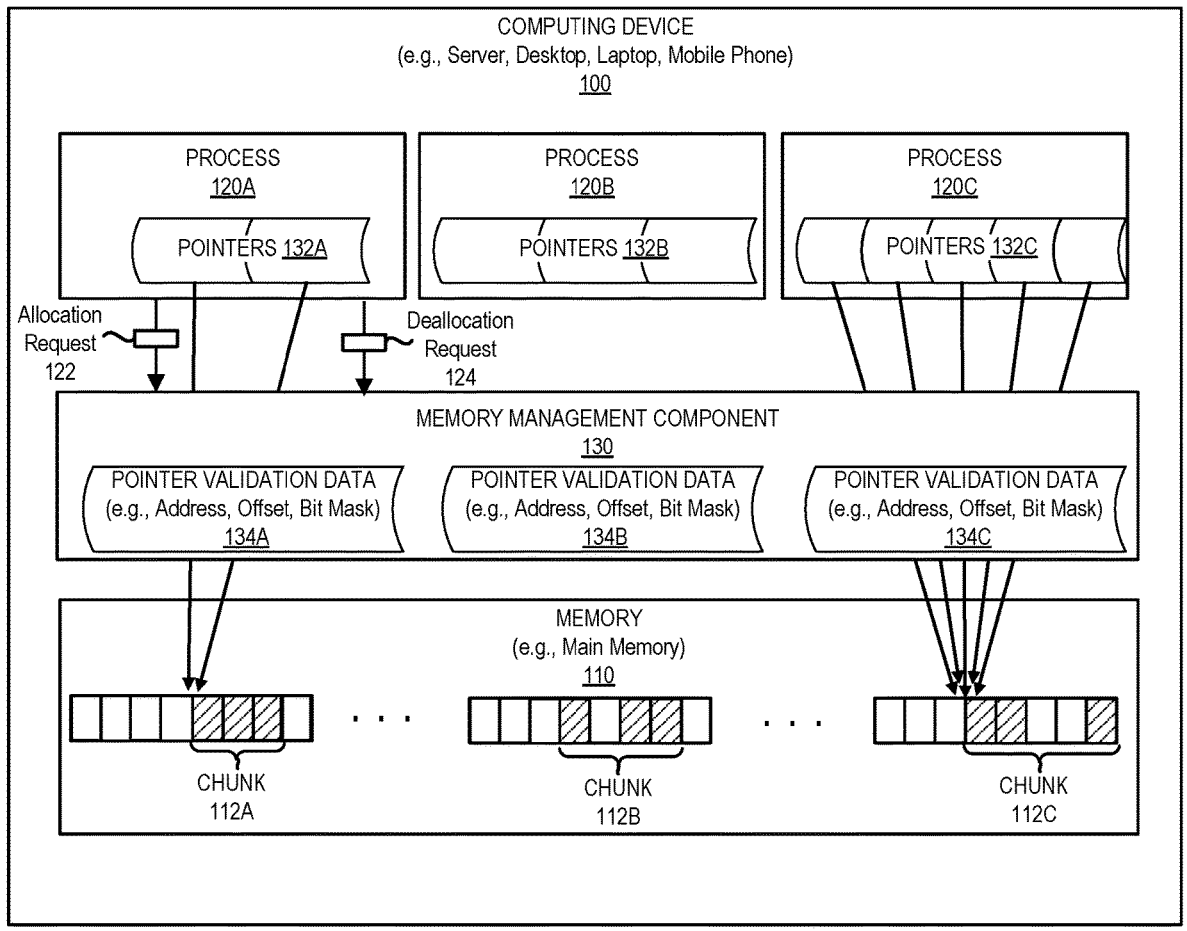
FIG. 1 depicts a high-level block diagram of an example computing device, in accordance with one or more aspects of the present disclosure.

Modern computing devices include memory management components that manage the allocation and deallocation of memory and include techniques to optimize the reuse of memory. The reuse of memory may involve fulfilling a memory allocation request with memory that was previously deallocated. Many programming logic errors arise when allocating and deallocating memory, for example, "use after free" and "double free." The "use after free" logic error may arise when memory is deallocated but the pointer corresponding to the deallocated memory is subsequently used. The pointer to the deallocated memory may be referred to as a "dangling pointer" and may be used to access memory that was subsequently reused to fulfill another allocation request. In some situations, the dangling pointer that points to memory that was previously deallocated may be reused to submit an additional deallocation request and cause the "double free" logic error. The double free logic error may occur when a program deallocates the same memory multiple times and between the deallocation requests the memory is reallocated. Being that the memory has been reallocated, it can and should be subsequently deallocated but the deallocation should be done by the entity (e.g., program, thread, function, method, variable) that is currently using the memory, not the entity that previously used the memory. For example, a first entity may deallocate memory before a second entity submits a request to allocate memory. The memory management component may fulfil the allocation request of the second entity by reusing the memory that was deallocated by the first entity. The first entity may include a programming logic error where it attempts to deallocate the memory a second time. An attempt to deallocate the memory a second time would typically be benign when the memory was previously deallocated. However, in this example the same memory was subsequently allocated for the second entity so when the first entity deallocates the memory, the deallocation may succeed and deallocate the memory in use by the second entity. This may not cause issues for the first entity but may cause the second entity to encounter unexpected results (e.g., memory corruption, security vulnerabilities, and segmentation faults).

Aspects of the present disclosure address the above and other deficiencies by providing technology that enables the detection and protection against "use after free" and "double free" programming logic errors. In one example, a computing device may receive a plurality of requests to allocate memory. The computing device may identify a chunk of memory to fulfill a first request and may subsequently reuse that chunk of memory to fulfill a second request. The computing device may return a pointer in response to each of the requests and the pointers may point to the same exact chunk of memory. Instead of using the same pointer for each request, the computing device may generate multiple different pointers and store pointer validation data. Each of the pointers may map to the same chunk of memory and a first pointer may be provided in response to the first request and a second pointer may be provided in response to a second request. The first pointer may still point to the chunk even though the chunk is being reused via the second pointer. The pointer validation data may be used to determine whether a pointer is invalid (e.g., pointer already used to deallocate memory) or valid (e.g., used for allocated memory and not yet used to deallocate the memory).

The systems and methods described herein include technology that enhances memory management for a computer system. In particular, aspects of the present disclosure provide technology that enhances the reliability, security, efficiency, and/or performance of memory management for a computer system. The technology may enhance the reliability or stability of the computing device by detecting, avoiding, or protecting against the use after free or double free programming logic errors. In one example, the technology may protect against a double free programming logic error by ignoring a subsequent request to deallocate memory when the memory is being properly reused and referenced by another pointer. Detecting a double free logic error (e.g., double deallocation) is often very challenging because not all duplicate requests to deallocate memory will cause the "double free" issue since it requires the memory be reused between deallocation requests. In addition, the code that includes the programming logic error that causes the "double free" issue may be different from the code that is adversely effected by the "double free" issue, which makes debugging more difficult. The technology disclosed herein may provide a validation function that can be called to check the validity of a pointer in the code that would have caused the double free issue and can indicate the double free issue has arisen or can protect against the double free issue from occurring (e.g., do not perform the second deallocation requests). The technology may also or alternatively enhance the security of the computer system against a temporal attack by detecting when an old dangling pointer is being used to access a chunk of memory that has been reused and is being referenced by a new pointer (e.g., "use after free"). This may be advantageous because the technology can detect and protect against malicious code that allocates and deallocates memory with the hope that its dangling pointers will provide access to the memory when the memory is subsequently reused.

Various aspects of the above referenced methods and systems are described in details herein below by way of examples, rather than by way of limitation. The examples provided below discuss a computing device that uses virtual memory as a layer of abstraction over the physical memory, but in other examples the computing device may be absent virtual memory and may include one or more pointers directly to the physical memory.

FIG. 1 depicts an illustrative architecture of computing device 100, in accordance with an example of the present disclosure. It should be noted that other architectures for computing device 100 are possible, and that the implementation of a computing device utilizing embodiments of the disclosure are not necessarily limited to the specific architecture depicted. Computing device 100 may be a single host machine or multiple host machines arranged in a heterogeneous or homogenous group (e.g., cluster or grid) and may include one or more rack mounted servers, workstations, desktop computers, notebook computers, tablet computers, mobile phones, palm-sized computing devices, personal digital assistants (PDAs), etc. In one example, computing device 100 may be a computing device implemented with x86 hardware (e.g., Intel®, AMD®). In another example, computing device 100 may be a computing device implemented with PowerPC®, SPARC®, ARM®, or other hardware. In the example shown in FIG. 1, computing device 100 may include memory 110, a memory management component 130, and one or more processes 120A-C.

Memory 110 may correspond to one or more data storage devices that are capable of storing data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. Memory 110 may include a one or more hardware memory devices and may include volatile memory devices (e.g., random access memory (RAM)), non-volatile memory devices (e.g., flash memory, NVRAM), and/or other types of memory devices.

In one example, memory 110 may be the primary storage of computing device and may be referred to as the main memory of computing device 100. Memory 110 may be part of a caching hierarchy with multiple different physical storage devices that are organized in multiple levels that include a combination of one or more other storage devices, such as processor registers, cache devices, hard drives, solid state drives (SSD)), other data storage devices, or a combination thereof. Memory 110 may be organized or managed as one or more chunks 112A-C Chunks 112A-C may be units of memory 110 that may be allocated for use by one or more processes 120A-C. Chunks 112A-C may include portions of virtual memory, logical memory, physical memory, other memory, or a combination thereof. Each of the chunks 112A-C may include a sequence of bytes or bits and may be a contiguous chunk (e.g., chunk 112A), non-contiguous chunk (e.g., chunk 112B-C), or a combination thereof. Each of chunks 112A-C may correspond to one or more memory pages, memory frames, memory segments, memory blocks, other portion of memory, or a combination thereof. In the example shown in FIG. 1, memory 110 may include three chunks 112A-C and each of the chunks may be designated to be used by one or more processes 120A-C. For example, chunk 112A may be allocated to process 120A, chunk 112B may be allocated to process 120B, and chunk 112C may be allocated to process 120C.

Processes 120A-C may be any computing processes that include program instructions that are executed by computing device 100. Processes 120A-C may include user space processes (e.g., application processes), a kernel processes (e.g., system processes), hypervisor processes, virtual machine processes, container processes, other processes, or a combination thereof. Each of the processes 120A-C may include one or more threads or instruction streams that can request access to memory resources and may be able to increase or decrease the amount of memory it is assigned by submitting one or more allocation requests 122 and deallocation requests 124 respectively.

An allocation request 122 may be a message transmitted from a process to the memory management component 130 that requests additional memory resources be assigned to the requesting process. Allocation request 122 may or may not indicate a quantity of memory, a use of memory (e.g., Read only, read/write, Copy on Write(CoW)), a type of memory (e.g., DRAM, NVRAM), a duration of time, other attribute, or a combination thereof. Memory management component 130 may respond to allocation request 122 by allocating a chunk of memory and providing a pointer to the allocated chunk. A deallocation request 122 may be a message transmitted from the process to the memory management component 130 that requests memory resources be released. Deallocation request 122 may indicate the chunk to be released by proving the pointer to the chunk.

The process may initiate allocation request 122 and deallocation request 122 by executing shared code of the memory management component 130. The shared code may be accessible to each of the processes and may be statically linked or dynamically linked to the process. The shared code may originate from a shared library (e.g., shared object (SO), dynamic-link library (DLL)), an executable (EXE), other location, or a combination thereof. The shared code may include one or more function calls, operands, instructions, opcodes, commands, or a combination thereof and may be based on proprietary code, open source code, standardized code, or a combination hereof. In one example, the shared code may be from one or more standard libraries that are the same or similar to the C standard library (libc, stdlibc), C++ standard library (libc++, stdlibc++), GNU library for C (glibc), Microsoft Standard Library (stdlib), other library, or a combination thereof. The standard library may include functions to allocate and deallocate memory and the allocation request 122 may be result of a process executing a call to malloc, alloc, realloc, calloc, new, or other memory allocation function and deallocation request 122 may be the result of the process executing a call to free, delete, release, or other memory deallocation function.

Memory management component 130 may manage memory 110 and provide dynamic memory allocation for processes 120A-C. Memory management component 130 may include features that are provided by code executing in user space, kernel space, or firmware or by features provided by hardware circuitry of a memory device or processor (e.g., Memory management Unit (MMU), memory controller). The dynamic memory allocation may involve processing allocation requests 122 and deallocation requests 122 to perform runtime allocation and deallocation of memory. Memory management component 130 may provide processes 120A-C with access to memory by providing processes 120A-C with pointers 132A-C.

Pointers 132A-C may include pointers to chunks of memory that have been allocated by memory management component 130. The pointers may be generated by memory management component 130 during memory allocation and may be provided to the processes in response to allocation requests. The pointers may also be provided by the process to the memory management component 130 with subsequent deallocation requests. Each pointer may be a data structure that includes one or more memory addresses that corresponds to (e.g., mapped to) a beginning portion, an end portion, or an intermediate portion of a chunk of memory 110. The one or more memory addresses may correspond to a virtual memory address (e.g., virtual address), a logical memory address (e.g., logical address), a physical memory address (e.g., physical address), other address, or a combination thereof.

Each of pointers 132A-C may include a set of pointers and multiple pointers in the set may point to the same chunk. As shown in FIG. 1, pointers 132A may include a set of pointers to chunk 112A, pointers 132B may include a set of pointers to chunk 112B, and pointers 132C may include a set of pointers to chunk 112C. Each pointer in a set may have been generated by memory management component 130 and provided in response to an allocation request. During runtime, multiple pointers in the set may be used to access the same chunk of memory and memory management component 130 may ensure that each time a chunk is reused a different pointer is used so that the system can distinguish between the newer valid pointer and an older invalid pointer (e.g., dangling pointer). In one example, multiple pointers in the set may be used to access the chunk but at any particular point in time at most one pointer in the set may be valid while the remaining pointers in the set are considered invalid (e.g., no longer in use or have not been used yet). Memory management component 130 may determine whether a pointer in the set is valid or invalid by using pointer validation data 134.

Pointer validation data 134A-C may include data that is used to validate a pointer and determine whether the pointer is currently valid or currently invalid. Each item of pointer validation data 134A-C may correspond to a particular chunk of memory and a particular set of pointers. In the example shown in FIG. 1, pointer validation data 134A may correspond to chunk 112A and pointers 132A, pointer validation data 134B may correspond to chunk 112B and pointers 132B, and pointer validation data 134C may correspond to chunk 112C and pointers 132C. Memory management component 130 may create the pointer validation data or update existing pointer validation data when processing an allocation request, a deallocation request, or a combination thereof. The pointer validation data may indicate which pointer in the corresponding set is the current valid pointer for the corresponding chunk. The manner in which the pointer validation data indicates the valid pointer may vary. In one example, the pointer validation data may include the address of the valid pointer (e.g., virtual memory address of the pointer). In another example, pointer validation data may indicate that the current valid pointer includes an offset and the memory management component 130 can check if the pointer in use has the expected offset (e.g., masking bit set). In either example, the pointer validation data may be stored in different locations. In one example, pointer validation data may be stored as an in-line data structure for each chunk (e.g., as a memory tag in or adjacent to each chunk). In another example, the pointer validation data may be stored separate from the chunk in a data structure that corresponds to the chunk and may include attributes about the chunk (e.g., size and location of chunk). These and other examples are discussed in more detail below in regards to FIG. 2 and FIG. 3.

Figure 2:
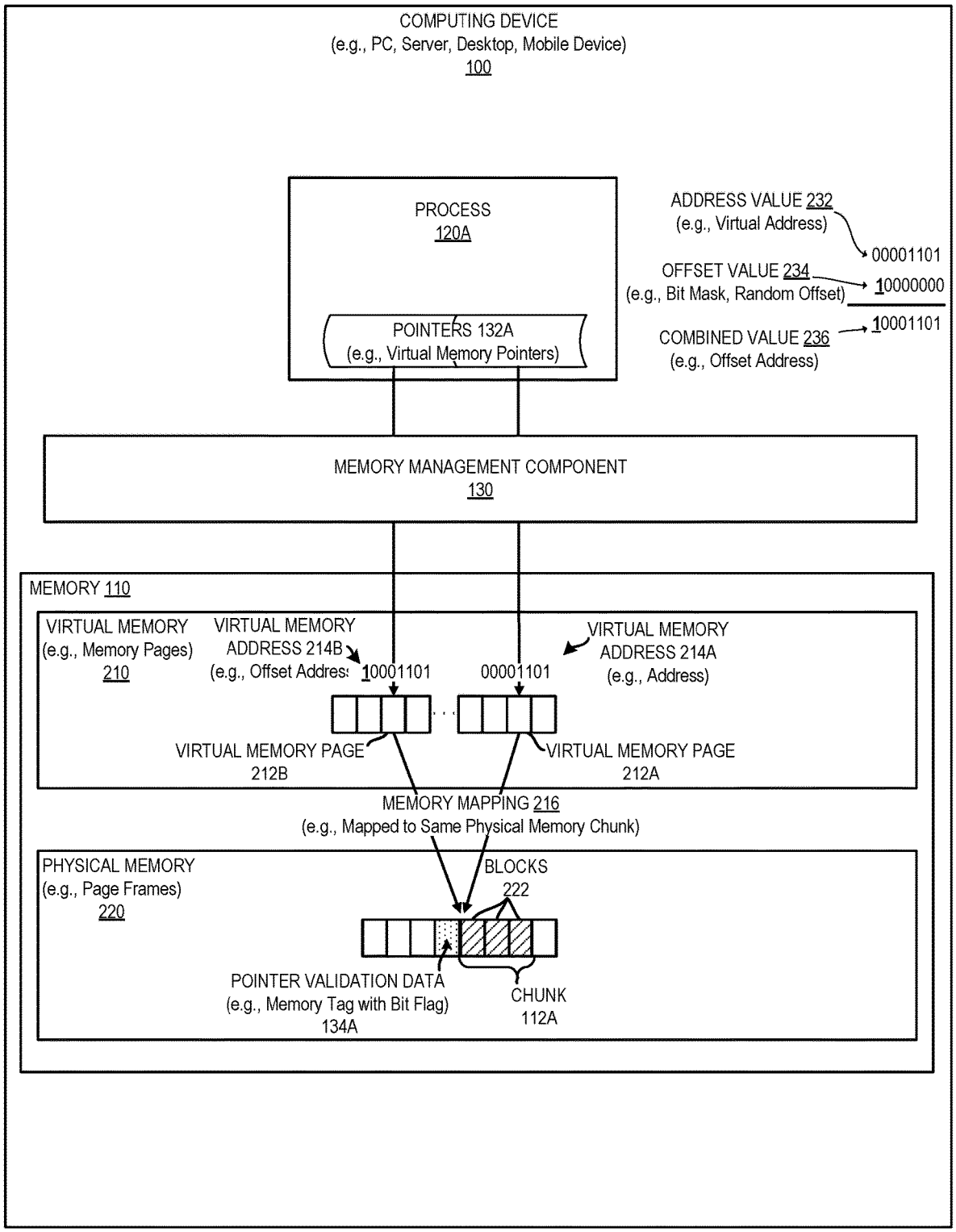
FIG. 2 depicts a block diagram of an example computing device that stores pointer validation data as a memory tag, in accordance with one or more aspects of the present disclosure.
Figure 3:
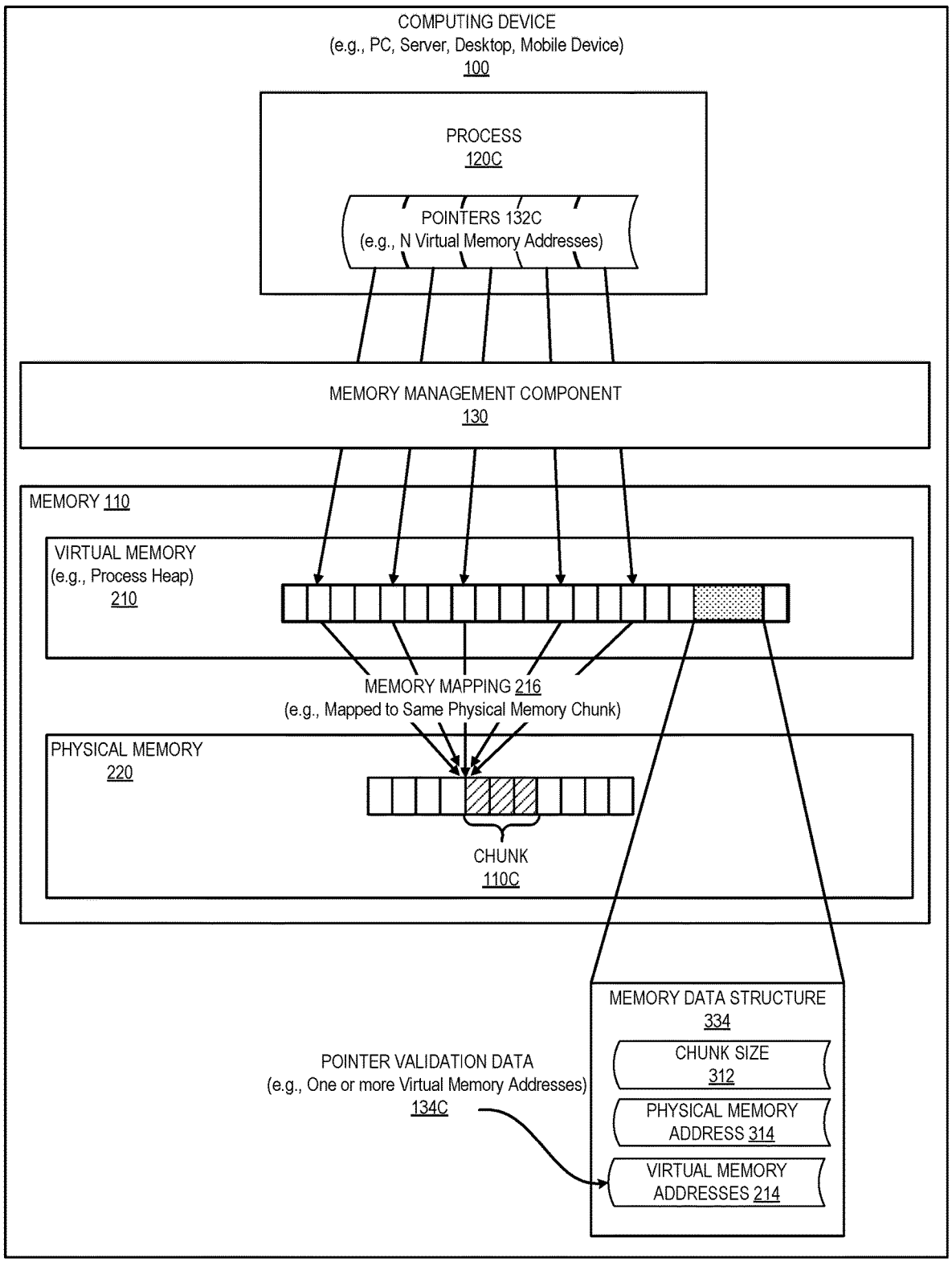
FIG. 3 depicts a block diagram of an example computing device that stores pointer validation data in a data structure, in accordance with one or more aspects of the present disclosure.

FIG. 2 and FIG. 3 depict illustrative examples of a computing device 100 that include a layered memory system that includes virtual memory 210 and physical memory 220 and may provide protection, avoidance, or detection of "use after free" and "double free" logic errors by using a set of virtual memory pointers that are mapped to the same chunk of physical memory. In FIG. 2, the pointer validation data may be stored in-line with the chunk as a memory tag. In FIG. 3, the pointer validation data may be included in a data structure that is stored separate from the chunk. It should be noted that other storage arrangements are possible, and that the implementation of a computing device utilizing embodiments of the disclosure are not necessarily limited to the specific architecture depicted.

Physical memory 220 may include one or more physical memory devices that include the hardware used to store data. Physical memory 220 may be physically organized as one or more blocks 222 and each chunk of physical memory 220 may include one or more blocks 222. A block may be the unit used to access data storage of the physical memory devices (e.g., smallest access unit). In one example, a block may be the same or similar to a memory frame, memory unit, other unit, or a combination thereof.

Virtual memory 210 may be a logical arrangement of memory and may include one or more memory pages. Each memory page may correspond to a virtual memory address that uniquely identifies a location in virtual memory 210. The location in virtual memory 210 may then be mapped to one or more blocks in physical memory 220. Virtual memory 210 may include a portion of memory space that is assigned to the one or more processes and may be the same or similar to user space memory, kernel space memory, or a combination thereof. In one example, virtual memory 210 may correspond to a heap of the respective computing process (e.g., process 120A for FIG. 2, and process 120C for FIG. 3).

Referring to FIG. 2, memory management component 130 may enable the detection of logic errors by providing process 120A with multiple pointers 132A to the same chunk of memory (e.g., chunk 112A). Pointers 132A may be a set of virtual memory pointers that point to different virtual memory pages 214A-B and each of the different virtual memory pages 214A-B may be mapped to the same chunk 112A via memory mapping 216. Memory mapping 216 may involve one or more data structures (e.g., page tables) that map the virtual memory addresses (e.g., memory pages) to physical memory addresses (e.g., memory blocks, frames).

Memory management component 130 may generate pointers 132A and provide the pointers to process 120A in response to allocation requests. Generating pointers 132A may involve memory management component 130 identifying an available virtual memory address in the storage space associated with process 120A (e.g., memory page in user space or kernel space). The available virtual memory address may be used as the first pointer in the set of pointers 132A. The second pointer in the set of pointers 132A may be an offset address. In the example of FIG. 2, the available virtual memory address may be virtual memory address 214A (e.g., 00001101) and the offset address may be virtual memory address 214B (e.g., 100001101).

Memory management component 130 may generate the offset address by combining an address value 232 with an offset value 234 to derive the combined value 236. Address value 232 may be the same or similar to the available virtual memory address (e.g., first pointer) and offset value 234 may be any value that can be combined with the address value 232. Offset value 234 may be a numeric value that is based on one or more binary values (e.g., 1000 0000), hexadecimal values (e.g., 0x40), integer values (64), decimal values, other values, or a combination thereof. Offset value 234 may be a predetermined value (e.g., preselected value), a randomly generated value (e.g., random value, pseudo-random value), or a combination thereof and may be determined before, during, or after the available virtual memory address is identified. In one example, offset value 234 may be a value that is selected during the design or installation of memory management component 130 (e.g., predetermined bit mask value). In another example, offset value 234 may be selected during runtime of the computing device (e.g., depending on virtual memory address size or available virtual memory addresses)

Combining offset value 234 and address value 232 may involve one or more mathematical operations that generate combined value 236. The mathematical operations may include bitwise operations (e.g., or, xor, and, not, shift), arithmetic operations (e.g., addition, subtraction, multiplication, division), other mathematical operation, or a combination thereof. In the example shown in FIG. 2, the address value 232 may be based on the available virtual memory address 214A and represented as a binary value (e.g., 0000 1101) and offset value 234 may be a bit mask and represented as a binary value (e.g., 1000 0000). The bit mask may correspond to setting the highest order bit in a virtual machine address (e.g., bit 40 for a processor that can address 40 bits of virtual memory). Combining address value 232 (e.g., 0000 1101) and offset value 234 (e.g., 1000 0000) may involve performing a bitwise OR operation that sets the highest order bit of address value 232 to produce combined value 236 (e.g., 1000 1101).

Memory management component 130 may store pointer validation data 134 that indicates which pointer in the set of pointers 132A is the valid pointer. In the example shown in FIG. 2, pointer validation data 134 may be stored in physical memory 220 as one or more memory tags. A memory tag may be stored at any location in physical memory 220 and may be included in chunk 112A (e.g., beginning or ending of chunk), adjacent to chunk 112A (e.g., before or after chunk), other location, or a combination thereof. The memory tag may have any size (e.g., bit, byte, block, segment, frame, page, chunk). In one example, pointer validation data 134A may include an offset indicator in the form of a boolean value (e.g., true/false, bit flag) that indicates whether the valid pointer includes an offset (e.g., true) or does not include the offset (e.g., false). The pointer validation data 134A may also or alternatively include the offset value (e.g., random value, bit mask). In another example, pointer validation data 134A may include a numeric value that indicates the count of the current or previous allocation request. The count may be analyzed to determine whether the current allocation request is even or odd and may be used to toggle between two or more pointers (e.g., standard address for even requests and offset address for odd requests). In yet another example, pointer validation data 134 may include the address of the valid pointer (e.g., available address or the offset address).

Referring to FIG. 3, memory management component 130 may also or alternatively store pointer validation data (e.g., 134C) in one or more memory data structures 334. Memory data structure 334 may correspond to one or more chunks and may store attributes about the one or more chunks. Memory data structure 334 may be stored in memory 110 with the one or more chunks it corresponds to. In one example, memory data structure 334 and chunk 112 may be stored in physical memory 220 and mapped to locations in virtual memory 210 that are assigned to process 120C. The locations in virtual memory 210 may be in the heap of process 120C, in a stack of process 120C, or a combination thereof. This may be advantageous because it may enable process 120C to execute code that can access the pointer validation data 134 and enable the process to determine whether a pointer is valid without making a call (e.g., system call, hypercall) to the memory management component to determine the pointer validity. This may also apply to the memory tag implementation discussed above.

Memory data structure 334 may include data that indicates attributes of the one or more chunks. The attributes may relate to sizes (e.g., number of pages, blocks, bytes, bits), locations (e.g., virtual address, physical address), access types (e.g., read-only, writable, copy on write), load status (e.g., paged in/out), dirty indicator (e.g., dirty bit), other attribute, or a combination thereof. In the example shown in FIG. 3, memory data structure 334 may uniquely correspond to a single chunk 112C and may include attribute data of the single chunk without including attribute data for any other chunks (e.g., free, missing, without, or absent data for all other chunks). The data may include a chunk size 312 (e.g., 4 MB), a physical memory address 314 (e.g., physical address of chunk 112C), and one or more virtual memory addresses 214 (e.g., pages mapped to chunk 112C). The one or more virtual memory addresses 214 may correspond to one or more of the pointers 132C. In one example, virtual memory addresses 214 in memory data structure 334 may be a single address that corresponds to a single valid pointer in the set of pointers 132C. In another example, the virtual memory addresses 214 in memory data structure 334 may include a set of addresses that correspond to the set of pointers 132C and there may be another attribute that indicates which of the virtual memory addresses is valid, invalid, or a combination thereof.

Figure 4:
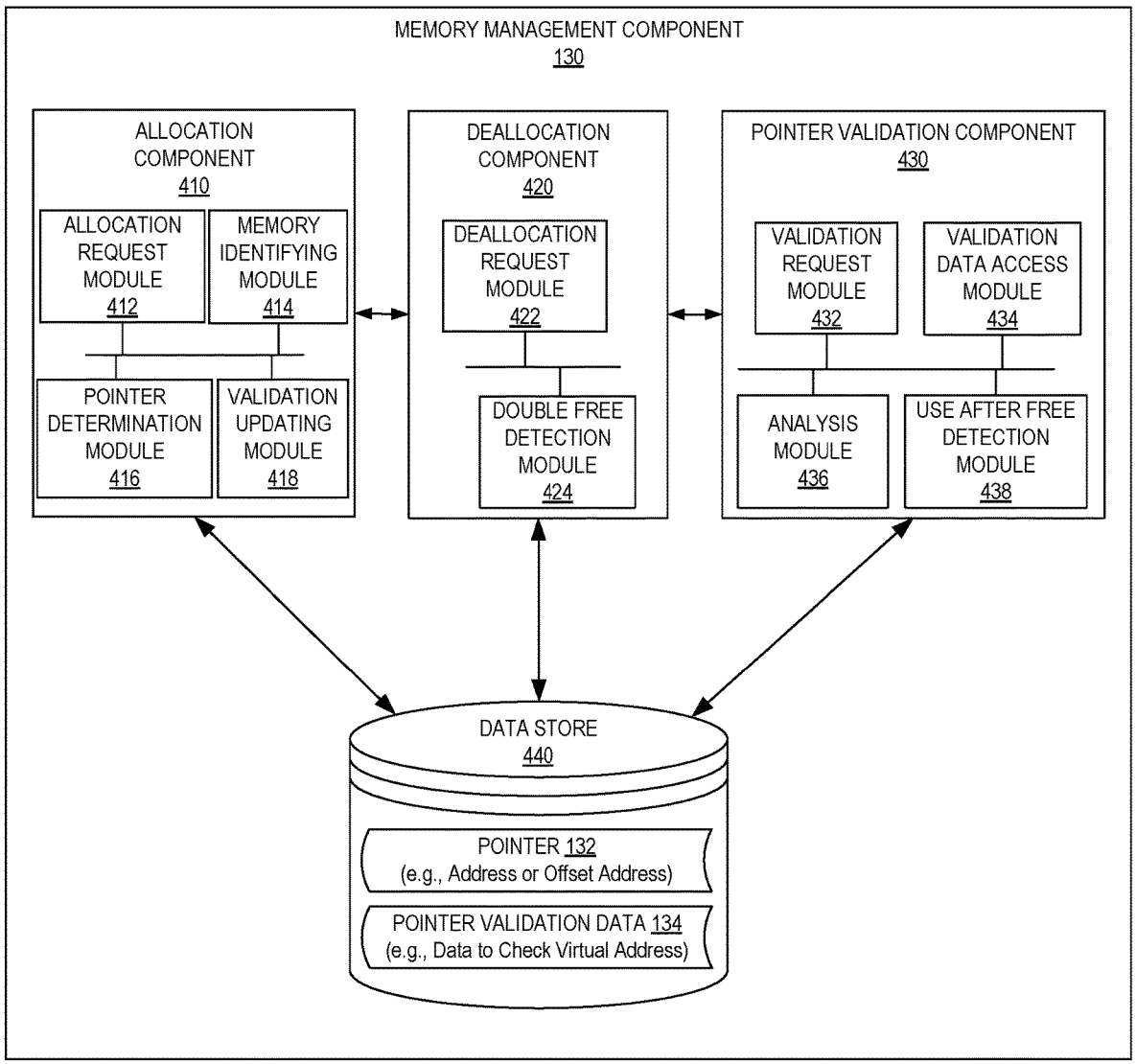
FIG. 4 depicts a block diagram of an example memory management component, in accordance with one or more aspects of the present disclosure.

FIG. 4 depicts a block diagram illustrating an exemplary memory management component 130 that includes technology for detecting or avoiding logic errors that occur from memory deallocation (e.g., "double free" and "use after free" logic errors), in accordance with one or more aspects of the present disclosure. Memory management component 130 may be the same or similar to memory management component 130 of FIGS. 1-3. The components, modules, and features discussed below in regards to memory management component 130 may be executed by a process, kernel, device driver, operating system, firmware, hardware circuitry, other aspect of a computing device, or a combination thereof. For example, memory management component 130 may provide one or more features that are executed by a process (e.g., via shared library code) and one or more features that are executed by a kernel. More or less components or modules may be included without loss of generality. For example, two or more of the components may be combined into a single component, or features of a component may be divided into two or more components. In the example shown in FIG. 4, memory management component 130 may include an allocation component 410, a deallocation component 420, and a pointer validation component 430.

Allocation component 410 may enable a computing device to allocate portions of memory during runtime to fulfill requests from processes executed by the computing device. In the example shown, allocation component 410 may include an allocation request module 412, a memory identifying module 414, a pointer determination module 416, and a validation updating module 418.

Allocation request module 412 may enable the computing device to initiate and process allocation requests. An allocation request may be initiated by a process by executing a call to an allocation function (e.g., malloc, new). The allocation function may be included in shared code that is accessible to the process and may be used to submit one or more allocation requests. The allocation requests may cause a message to be transmitted from a process to memory management component 130 and may be detected by allocation request module 412. Each allocation request may include data that may indicate a quantity of memory, a use of memory (e.g., Read only, read/write, Copy on Write (CoW)), a type of memory, a duration of time, other attribute, or a combination thereof.

Memory identifying module 414 may enable the computing device to identify a chunk of memory. The chunk of memory may be a chunk of virtual memory, logical memory, physical memory, other memory, or a combination thereof. Memory identifying module 414 may identify the chunk of memory by analyzing the current state of memory resources to determine one or more chunks of memory that are available for use and are not currently in use. Memory identifying module 414 may then select a chunk that satisfies the allocation request (e.g., equal to or greater than the requested size). Memory identifying module 414 may include code that performs the analysis of the available memory resources or may execute an instruction (e.g., system call, hypercall, hardware instruction) to have another feature of computing device identify the chunk. In one example, the chunk may be a chunk of physical memory that is available in main memory (e.g., primary storage) of the computing device. The chunk may be continuous and correspond to a single physical memory address or may be non-continuous and correspond to one or more physical memory addresses.

Pointer determination module 416 may enable the computing device to generate a set of pointers to the same identified chunk of memory and to provide a pointer of the set to satisfy each of the allocation requests. Pointer determination module 416 may generate the set of pointers before, during, after, or in response to identifying a chunk of memory or receiving one or more of the allocation requests.

In one example, multiple pointers in the set (e.g., all of the pointers in the set) may be generated in response to the first allocation request before receiving any subsequent allocations requests. In another example, a single pointer in the set may be generated in response to each allocation request and multiple allocations requests may cause the set to include multiple pointers. In either example, each pointer in the set may point to a different location in virtual memory and the different locations in virtual memory may point to the same location in physical memory (e.g., different virtual memory locations but a common physical memory location). The location in virtual memory may correspond to a virtual memory page (e.g., first page) and the location in physical memory may correspond to a physical memory block (e.g., first block of chunk). A pointer may point to a location in virtual memory by including a virtual memory address and may point to a location in physical memory by being mapped to a physical memory address (e.g., via a page table). Each of the different locations in virtual memory (e.g., virtual memory pages) may be mapped to the same location in physical memory (e.g., mapped to same block). Therefore, the virtual memory provides a layer of indirection that causes the set of pointers to indirectly point to the same location in physical memory even though each pointer directly points to a different location in virtual memory.

Generating the set of pointers may involve identifying one or more available chunks from the virtual memory associated with the process initiating the allocation request. Identifying the one or more chunks of virtual memory may be the same or similar to the method discussed above to identify a chunk of physical memory. Each of the one or more chunks of virtual memory may correspond to a virtual memory address and the virtual memory address may be used as a first pointer to uniquely identify the available chunk. The other pointers in the set may or may not be mathematically related to the first pointer. In one example, the set of pointers may include pointers that are not mathematically related and may be based on different virtual memory addresses selected from the virtual memory address space of the process. Each of the different virtual memory addresses may correspond to an available virtual memory address in the heap of the process that initiated the allocation request. In another example, the set of pointers may be mathematically related and may be based on a virtual memory address and one or more offsets. Each of the pointers in the set may be mathematically related to one or more of the other pointers and they may all be based directly or indirectly on the same virtual memory address of the available chunk of virtual memory (e.g., available memory page(s)). For example, a first pointer may be represented by the virtual memory address and one or more of the other pointers in the set may be a mathematical combination of the virtual memory address and one or more offsets. As discussed above, combining the virtual memory address with an offset may involve a bitwise operation using a bit mask (e.g., setting highest order bit), an arithmetic operation using a numeric value (e.g., mapped file offset), other mathematical operation using a predetermined or random value, or a combination thereof.

Pointer determination module 416 may select a pointer to fulfill an allocation request and the selection of the pointer may be performed in different manners. In one example, pointer determination module 416 may randomly or pseudo-randomly select a pointer from the set. In another example, pointer determination module 416 may select a pointer based on a count associated with the current allocation request. The count may be stored as part of pointer validation data 134 and may be a numeric value that is increased or decreased (e.g., incremented or decremented) each time an allocation request is initiated, received, processed, or fulfilled. Pointer determination module 416 may analyze the count and select a pointer based on the count. For example, when the count is a first value (e.g., even value, 0, null, absent) the pointer determination module 416 may select the standard address that is absent the offset as the pointer (e.g., 0000 1101) and when the count is a second value (e.g., odd, 1) pointer determination module 416 may select an offset address as the pointer (e.g., 1000 1101). In yet another example, pointer determination module 416 may select a pointer based on an offset indicator that may be stored as pointer validation data. The offset indicator may be similar to a count but may be evaluated as a boolean (e.g., true/false) and may indicate whether or not a previously provided pointer used an offset. Based on the offset indicator, pointer determination module 416 may select and provide a pointer that uses an offset address when the previous pointer was absent an offset and a pointer that is absent an offset when the previous pointer used an offset. This may be referred to as toggling between pointers and each subsequent allocation request may result in providing a pointer that toggles between the address and the offset address.

Validation updating module 418 may enable the computing device to update pointer validation data 134 in view of the selected pointer that was provided to the process that initiated the allocation request. Validation updating module 418 may update pointer validation data 134 by storing, reading, writing, overwriting, incrementing, decrementing, toggling, appending, or replacing some or all of pointer validation data 134. Validation updating module 418 may update the pointer validation data 134 before, during, after, or in response to the generation, selection, or providing of a pointer. In one example, pointer validation data 134 may be updated after providing a first pointer and before, during, or after providing a second pointer. The update pointer validation data 134 may indicate that the first pointer is now invalid for accessing the chunk of memory and that the second pointer is now valid for accessing the chunk of memory.

Validation updating module 418 may store the updated pointer validation data 134 in different portions of memory, as discussed in regards to FIGS. 2 and 3. In one example, validation updating module 418 may update pointer validation data 134 by modifying a memory tag that is within the chunk or adjacent to the chunk of memory pointed at by the selected pointer. In another example, validation updating module 418 may update pointer validation data 134 by modifying a data structure that is associated with the chunk (e.g., linked with chunk) and is stored separate from the chunk pointed at by the selected pointer.

Deallocation component 420 may enable a computing device to deallocate portions of memory during runtime in response to requests from processes executed by the computing device. In the example shown in FIG. 4, deallocation component 420 may include a deallocation request module 422 and a double free detection module 424.

Deallocation request module 422 may enable the computing device to initiate and process deallocation requests. A deallocation request may be initiated by a process by executing a call to a deallocation function (e.g., free, delete). The deallocation function may be included in shared code that is accessible to the process and may be used to submit one or more deallocation requests. The deallocation requests may cause a message to be transmitted from a process to the memory management component 130 and may be detected by deallocation request module 422. Each deallocation request may include data that indicates a location of memory that is to be deallocated (e.g., pointer to chunk being freed).

Double free detection module 424 may enable the computing device to detect whether a deallocation request is associated with a chunk of memory that was previously deallocated and then reallocated (e.g. a reused chunk). The deallocation request may be initiated by a process and may include a pointer to the chunk of memory that the process intends to deallocate. Double free detection module 424 may interact with pointer validation component 430 to determine whether or not the pointer is valid (e.g., validate the pointer), as discussed in more detail below. In response to detecting the pointer is currently valid, double free detection module 424 may deallocate the chunk of memory associated with the pointer of the deallocation request. If response to detecting the pointer is currently invalid, double free detection module 424 may perform one or more actions.

The one or more action may vary depending on how the technology is used and may involve avoiding the deallocation of the chunk of memory. The one or more action may also or alternatively involve generating a message that indicates the deallocation request is invalid (e.g., double free), the pointer is invalid (e.g., dangling pointer, wild pointer), other action, or a combination thereof. The message may be in the form of a return value, exit status, exception, error message, informational message, other message, or a combination thereof. The message may be stored by the computing device and displayed, reported, logged, or a combination thereof.

Pointer validation component 430 may enable computing device to validate a pointer and detect whether the pointer points to a chunk of memory that was previously deallocated and is currently being reused. In one example, pointer validation component 430 may include a validation request module 432, a validation data access module 434, an analysis module 436, and a use after free detection module 438.

Validation request module 432 may enable the computing device to initiate and process a request to validate a pointer (e.g., pointer validation request). A pointer validation request may be initiated by the double free detection module 424 as discussed above or by a process using a call to a validation function. The validation function may be included in shared code that is accessible to the process and may be used to submit one or more validation requests. The validation function may receive a pointer as input and may return a value that indicates whether the pointer is valid or invalid. Each validation request may include pointer 132 and may cause a message to be transmitted from a process to memory management component 130.

Validation data access module 434 may enable the computing device to access the pointer validation data that corresponds to pointer 132 of the validation request. As discussed above, pointer 132 may be a virtual memory pointer that includes a virtual memory address of a virtual memory page that is mapped to a physical memory address of a chunk in physical memory. Validation data access module 434 may use the pointer, the virtual memory address, the physical memory address, the virtual memory page, or the chunk as an access value (e.g., key value, index value, location value) to determine which pointer validation data corresponds to the pointer of the validation request. In one example, validation data access module 434 may access the memory tag (e.g., inline data structure) associated with the chunk by accessing a location (e.g., virtual memory address and/or physical memory address) that is adjacent to the pointer or chunk (e.g., address value −1). The location may be before or after the chunk or at the beginning or ending of the chunk. In another example, validation data access module 434 may access a memory data structure that is associated with the chunk by searching an index based on the access value (e.g., physical memory address or virtual memory address). In either example, validation data access module 434 may access pointer validation data and store it in data store 440 as pointer validation data 134.

Analysis module 436 may enable computing device to analyze the pointer validation data 134 to determine whether pointer 132 of the validation request is valid or is invalid. In one example, determining pointer 132 is invalid may involve determining that pointer validation data 134 indicates an offset is in use and detecting that pointer 132 is absent the offset. In another example, determining pointer 132 is invalid may involve deriving a virtual memory address from pointer validation data 134 and comparing the derived virtual memory address with the virtual memory address of pointer 132. If the addresses match, it may indicate that pointer 132 of the validation request is valid (or invalid depending on implementation).

Use after free detection module 438 may enable the computing device to detect a logic error referred to as a "use after free" and perform one or more actions. A "use after free" logic error may occur when a dangling pointer is used after the chunk it points to is deallocated. A dangling pointer may be any pointer that points to a chunk of memory that was previously deallocated and it may remain a dangling pointer even though the chunk it points to is subsequently reused and referenced by a different pointer. A dangling pointer may be the same or similar to a dangling reference, wild pointer, wild reference, other term, or a combination thereof. The example discussed above in regards to double free detection module 424 may be an example of "use after free" that involves a deallocation request that includes a dandling pointer. "Use after free" may be problematic because it may enable a process to use the dangling pointer to access memory that is no longer allocated to the process and may be allocated to another process, thread, function, variable, other computing construct, or a combination thereof.

The one or more actions performed by the use after free detection module 438 may vary depending on how the technology is used and may involve restricting access to the chunk of memory. The one or more action may also or alternatively involve destroying the invalid pointer (e.g., setting it to Null, O, or other value) or generating a message. The message may indicate the existence of a use after free or that the pointer is invalid via a return value, exit status, exception, error message, informational message, other message, or a combination thereof. The message may be stored by the computing device and displayed, reported, logged, or a combination thereof.

Figure 5:
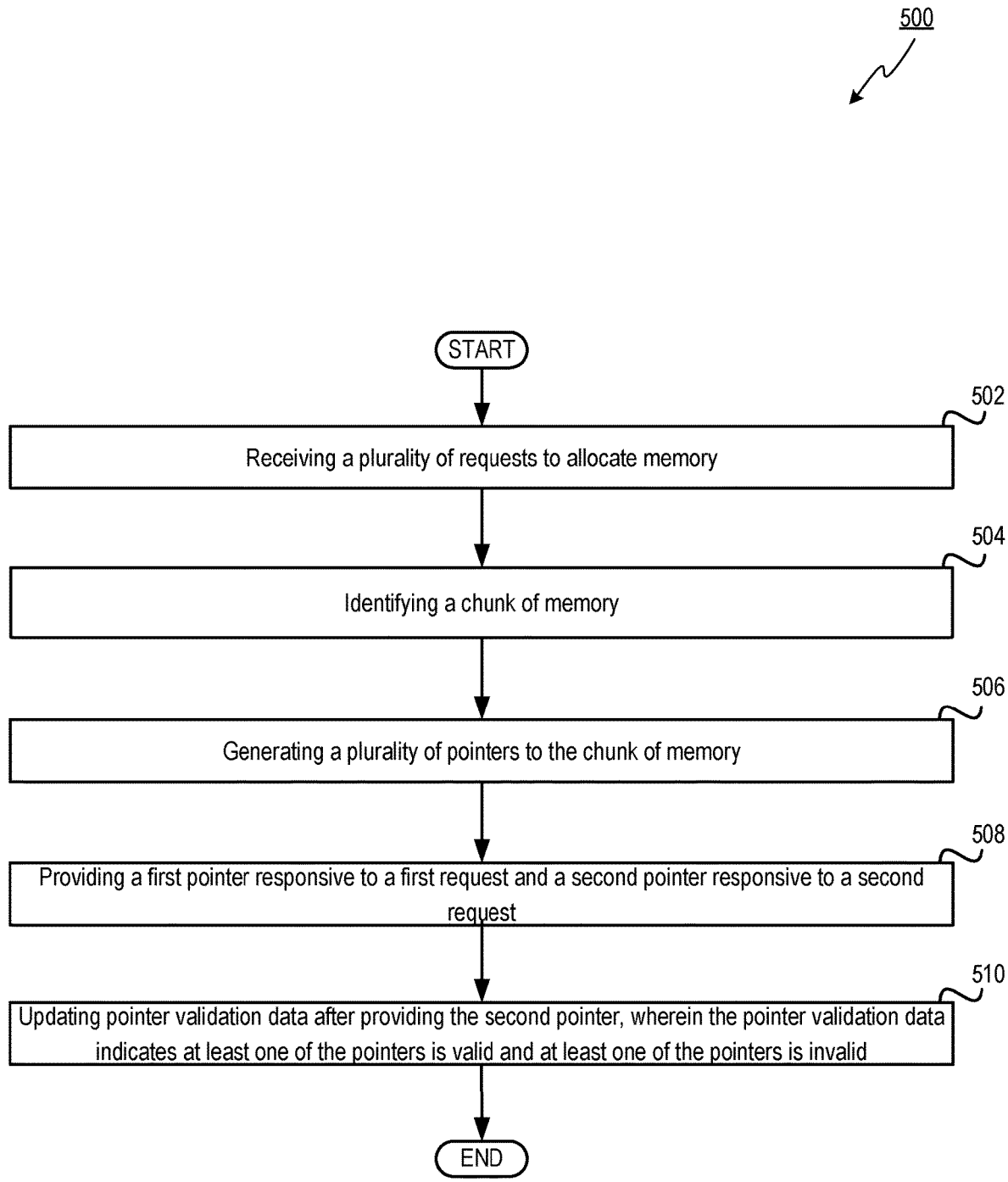
FIG. 5 depicts a flow diagram of an example method for determining the validity of a memory pointer, in accordance with one or more aspects of the present disclosure.
Figure 6:
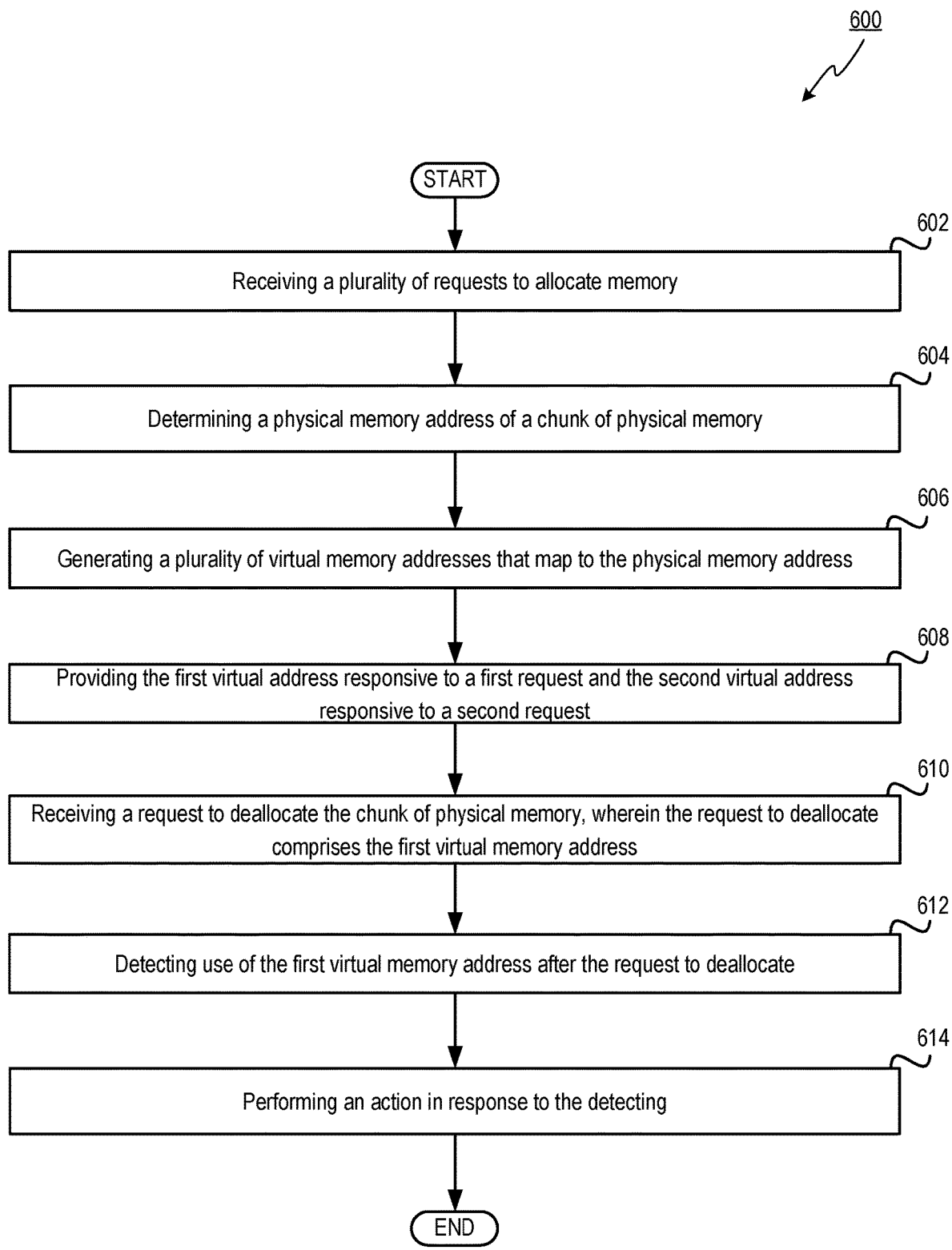
FIG. 6 depicts a flow diagram of another example method for determining the validity of a memory pointer, in accordance with one or more aspects of the present disclosure.

FIGS. 5 and 6 depict flow diagrams for illustrative examples of methods 500 and 600 for detecting, avoiding or protecting against logic errors that arise from allocating and deallocating memory, in accordance with one or more aspects of the present disclosure. Methods 500 and 600 may be performed by processing devices that may comprise hardware (e.g., circuitry, dedicated logic, programmable logic, microcode, etc.), executable code (such as is run on a general purpose computer system or a dedicated machine), or a combination of both. Methods 500 and 600 and each of their individual functions, routines, subroutines, or operations may be performed by one or more processors of the computer device executing the method. In certain implementations, methods 500 and 600 may each be performed by a single processing thread. Alternatively, methods 500 and 600 may be performed by two or more processing threads, each thread executing one or more individual functions, routines, subroutines, or operations of the method. In an illustrative example, the processing threads implementing methods 500 and 600 may be synchronized (e.g., using semaphores, critical sections, and/or other thread synchronization mechanisms). Alternatively, the processes implementing methods 500 and 600 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 500 and 600 may be performed by computing device 100 as shown in FIG. 1-3.

Referring to FIG. 5, method 500 may be performed by a processing devices (e.g., CPU) of a server device or a client device and may begin at block 502. At block 502, the processing device may receive a plurality of requests to allocate memory. Each of the requests may be allocation request that is initiated by a process and may be handled by a memory management component of the computing device. The allocation request may request additional memory resources be assigned to the requesting process and may or may not indicate a quantity of memory, a use of memory (e.g., Read only, read/write, Copy on Write(CoW)), a type of memory, a duration of time, other attribute, or a combination thereof.

At block 504, the processing device may identify a chunk of memory. The chunk may be a portion of available memory that will be assigned or designated for use by the one or more processes. The chunk may include one or more portions of virtual memory, logical memory, physical memory, other memory, or a combination thereof. The chunk may include a sequence of bytes or bits and may be a contiguous chunk, non-contiguous chunk, or a combination thereof. The chunk may correspond to one or more memory pages, memory frames, memory segments, memory blocks, other portion of memory, or a combination thereof. In one example, the chunk of memory may be a chunk of physical memory at a specific physical memory address and the plurality of pointers may be different virtual memory addresses that are mapped to the specific physical memory address.

At block 506, the processing device may generate a plurality of pointers to the chunk of memory. In one example, generating the plurality of pointers to the chunk of memory comprises generating the plurality of pointers after identifying the chunk of memory and prior to receiving the second request. In another example, generating the plurality of pointers to the chunk of physical memory comprises generating the first pointer responsive to the first request and generating the second pointer responsive to the second request. In either example, generating the plurality of pointers may involve determining a count of an allocation request of the plurality of requests. The count may indicate whether the allocation request is an even request or an odd request and responsive to the even request, generating a pointer that comprises the virtual memory address and responsive to the odd request, generating a pointer that comprises a combination of the virtual memory address and an offset. The offset may be a predetermined bit mask or a numeric value. In one example, the combination of the virtual memory address and the offset may be based on a bitwise operation of the virtual memory address and the predetermined bit mask and may set the highest order bit of the virtual memory address. In another example, the offset may be the numeric value and the combination of the virtual memory address and the offset may involve adding or subtracting the numeric value and the virtual memory address.

At block 508, the processing device may provide the first pointer responsive to the first request and the second pointer responsive to the second request. The processing may generate the respective pointer or select the respective pointer from the plurality of pointers in response to each request. The processing device may also update pointer validation data based on the respective pointer.

At block 510, the processing device may update pointer validation data after providing the second pointer. The pointer validation data may indicate at least one of the plurality of pointers is valid and at least one of the plurality of pointers is invalid. In one example, updating the pointer validation data may involve storing the pointer validation data as a memory tag adjacent to the memory pointed to by the plurality of pointers. The pointer validation data may be used to validate the second pointer and may include one or more of a boolean value, a counter value, an offset value, an address value, or a combination thereof. In another example, updating the pointer validation data may involve storing the pointer validation data in a data structure associated with the chunk of memory. The data structure may be stored in a heap of a computing process that initiated the plurality of requests and may include a size of the chunk, a physical memory address of the chunk, and a plurality of virtual memory addresses corresponding to the plurality of pointers.

The pointer validation data may be used to detect "use after free" or "double free" logic errors. Detecting use of the first pointer after a deallocation of the chunk (e.g., "use after free" or "double free") may involve receiving a deallocation request to deallocate the memory, wherein the deallocation request comprises the first pointer that points to the chunk of memory. The processing device may access the pointer validation data associated with the chunk of memory and determine the first pointer is invalid in view of the pointer validation data. In one example, determining the first pointer is invalid may involve determining that the pointer validation data indicates an offset is in use and detecting that the first pointer is absent the offset. In another example, determining the first pointer is invalid may involve deriving a virtual memory address from the pointer validation data and comparing the derived virtual memory address with the virtual memory address of the first pointer. Responsive to completing the operations described herein above with references to block 510, the method may terminate.

Referring to FIG. 6, method 600 may be performed by processing devices of a server device or a client device and may begin at block 602. At block 602, the processing device may receive a plurality of requests to allocate memory. Each of the requests may be allocation request that is initiated by a process and may be handled by a memory management component of the computing device. The allocation request may request additional memory resources be assigned to the requesting process and may or may not indicate a quantity of memory, a use of memory (e.g., Read only, read/write, Copy on Write(CoW)), a type of memory, a duration of time, other attribute, or a combination thereof.

At block 604, the processing device may determine a physical memory address of a chunk of physical memory. The chunk may be a portion of available memory that will be assigned or designated for use by the one or more processes. The chunk may include one or more portions of virtual memory, logical memory, physical memory, other memory, or a combination thereof. The chunk may include a sequence of bytes or bits and may be a contiguous chunk, non-contiguous chunk, or a combination thereof. The chunk may correspond to one or more memory pages, memory frames, memory segments, memory blocks, other portion of memory, or a combination thereof. In one example, the chunk of memory may be a chunk of physical memory at a specific physical memory address and the plurality of pointers may be different virtual memory addresses that are mapped to the specific physical memory address.

At block 606, the processing device may generate a plurality virtual memory addresses that map to the physical memory address of the chunk. In one example, generating the plurality of pointers to the chunk of memory comprises generating the plurality of pointers after identifying the chunk of memory and prior to receiving the second request. In another example, generating the plurality of pointers to the chunk of physical memory comprises generating the first pointer responsive to the first request and generating the second pointer responsive to the second request. In either example, generating the plurality of pointers may involve determining a count of an allocation request of the plurality of requests. The count may indicate whether the allocation request is an even request or an odd request and responsive to the even request, generating a pointer that comprises the virtual memory address and responsive to the odd request, generating a pointer that comprises a combination of the virtual memory address and an offset. The offset may be a predetermined bit mask or a numeric value. In one example, the combination of the virtual memory address and the offset may be based on a bitwise operation of the virtual memory address and the predetermined bit mask and may set the highest order bit of the virtual memory address. In another example, the offset may be the numeric value and the combination of the virtual memory address and the offset may involve adding or subtracting the numeric value and the virtual memory address.

At block 608, the processing device may provide the first virtual address responsive to the first request and the second virtual address responsive to the second request. The processing may generate the respective pointer or select the respective pointer from the plurality of pointers in response to each request. The processing device may also update pointer validation data based on the respective pointer.

At block 610, the processing device may receive a request to deallocate the chunk of physical memory. The request to deallocated the may include the first virtual memory address and may be initiated by a process by executing a call to a deallocation function (e.g., free, delete). The deallocation function may be included in shared code that is accessible to the process and may be used to submit one or more deallocation requests. The deallocation requests may cause a message to be transmitted from a process to the memory management component 130.

At block 612, the processing device may detect use of the first virtual memory address after the request to deallocate (e.g., "use after free" or "double free"). Detecting use of the first pointer after a deallocation of the chunk may involve receiving a deallocation request to deallocate the memory, wherein the deallocation request comprises the first pointer that points to the chunk of memory. The processing device may access the pointer validation data associated with the chunk of memory and determine the first pointer is invalid in view of the pointer validation data. In one example, determining the first pointer is invalid may involve determining that the pointer validation data indicates an offset is in use and detecting that the first pointer is absent the offset. In another example, determining the first pointer is invalid may involve deriving a virtual memory address from the pointer validation data and comparing the derived virtual memory address with the virtual memory address of the first pointer.

At block 614, the processing device may perform an action in response to the detecting. The action may involve one or more actions that depend on how the technology is used and may involve restricting access to the chunk of memory. The one or more action may also or alternatively involve destroying the first pointer (e.g., setting it to Null, O, or other value) or generating a message. The message may indicate the existence of a use after free or that the pointer is invalid via a return value, exit status, exception, error message, informational message, other message, or a combination thereof. The message may be stored by the computing device and displayed, reported, logged, or a combination thereof. Responsive to completing the operations described herein above with references to block 614, the method may terminate.

Figure 7:
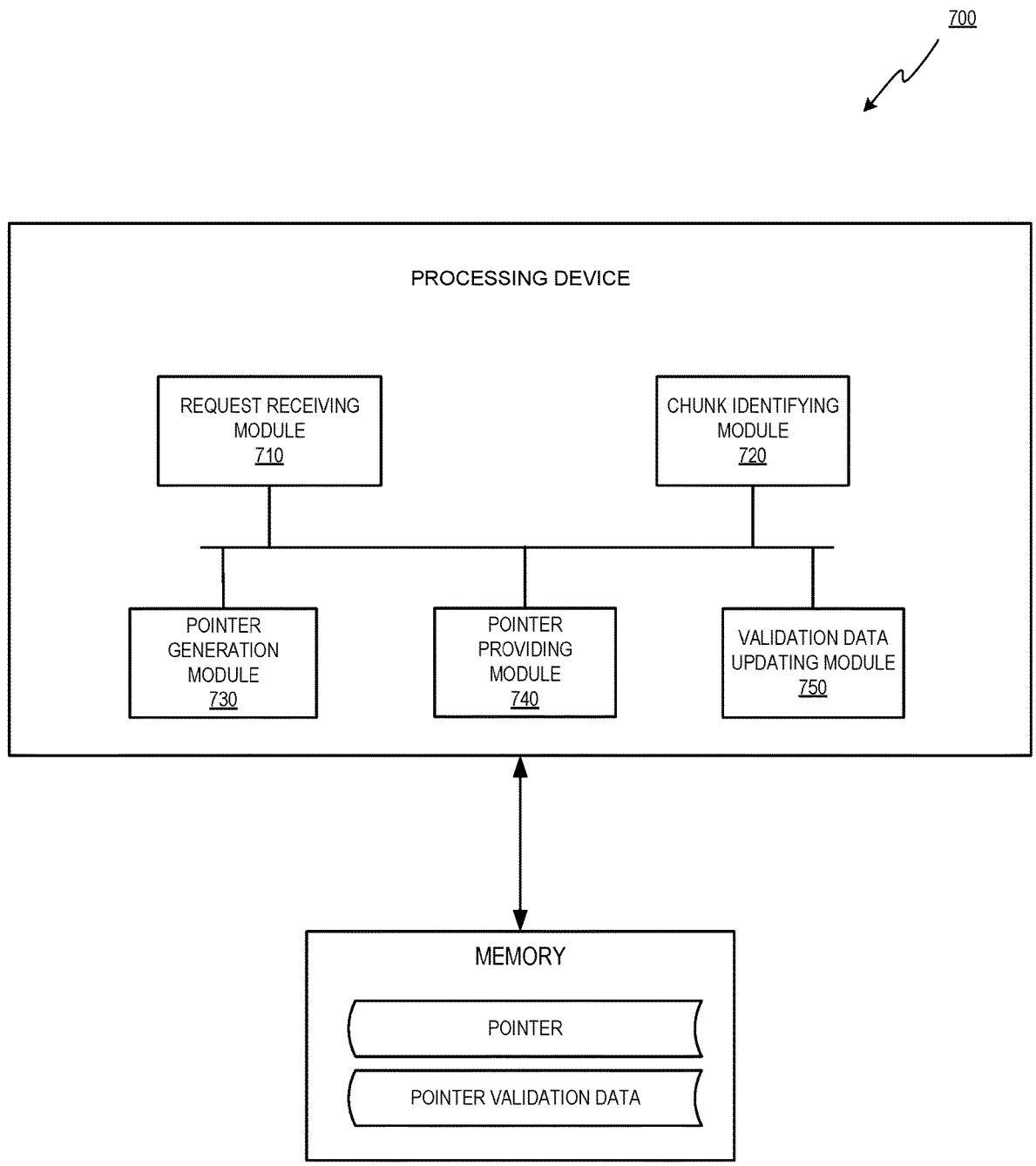
FIG. 7 depicts a block diagram of an example computing system operating in accordance with the examples of the present disclosure.

FIG. 7 depicts a block diagram of a computer system 700 operating in accordance with one or more aspects of the present disclosure. Computer system 700 may be the same or similar to computing device 100 and may include one or more processing devices and one or more memory devices. In the example shown, computer system 700 may include a request receiving module 710, a chunk identifying module 720, a pointer generation module 730, a pointer providing module 740, and a validation data updating module 750.

Request receiving module 710 may enable a processing device to receive a plurality of requests to allocate memory. Each of the requests may be allocation request that is initiated by a process and may be handled by a memory management component of the computing device. The allocation request may request additional memory resources be assigned to the requesting process and may or may not indicate a quantity of memory, a use of memory (e.g., Read only, read/write, Copy on Write(CoW)), a type of memory, a duration of time, other attribute, or a combination thereof.

Chunk identifying module 720 may enable the processing device to identify a chunk of memory. The chunk may be a portion of available memory that will be assigned or designated for use by the one or more processes. The chunk may include one or more portions of virtual memory, logical memory, physical memory, other memory, or a combination thereof. The chunk may include a sequence of bytes or bits and may be a contiguous chunk, non-contiguous chunk, or a combination thereof. The chunk may correspond to one or more memory pages, memory frames, memory segments, memory blocks, other portion of memory, or a combination thereof. In one example, the chunk of memory may be a chunk of physical memory at a specific physical memory address and the plurality of pointers may be different virtual memory addresses that are mapped to the specific physical memory address.

Pointer generation module 730 may enable the processing device to generate a plurality of pointers to the chunk of memory. In one example, generating the plurality of pointers to the chunk of memory comprises generating the plurality of pointers after identifying the chunk of memory and prior to receiving the second request. In another example, generating the plurality of pointers to the chunk of physical memory comprises generating the first pointer responsive to the first request and generating the second pointer responsive to the second request. In either example, generating the plurality of pointers may involve determining a count of an allocation request of the plurality of requests. The count may indicate whether the allocation request is an even request or an odd request and responsive to the even request, generating a pointer that comprises the virtual memory address and responsive to the odd request, generating a pointer that comprises a combination of the virtual memory address and an offset. The offset may be a predetermined bit mask or a numeric value. In one example, the combination of the virtual memory address and the offset may be based on a bitwise operation of the virtual memory address and the predetermined bit mask and may set the highest order bit of the virtual memory address. In another example, the offset may be the numeric value and the combination of the virtual memory address and the offset may involve adding or subtracting the numeric value and the virtual memory address.

Pointer providing module 740 may enable the processing device to provide the first pointer responsive to the first request and the second pointer responsive to the second request. The processing may generate the respective pointer or select the respective pointer from the plurality of pointers in response to each request. The processing device may also update pointer validation data based on the respective pointer.

Validation data updating module 750 may enable the processing device to update pointer validation data after providing the second pointer. The pointer validation data may indicate at least one of the plurality of pointers is valid and at least one of the plurality of pointers is invalid. In one example, updating the pointer validation data may involve storing the pointer validation data as a memory tag adjacent to the memory pointed to by the plurality of pointers. The pointer validation data may be used to validate the second pointer and may include one or more of a boolean value, a counter value, an offset value, an address value, or a combination thereof. In another example, updating the pointer validation data may involve storing the pointer validation data in a data structure associated with the chunk of memory. The data structure may be stored in a heap of a computing process that initiated the plurality of requests and may include a size of the chunk, a physical memory address of the chunk, and a plurality of virtual memory addresses corresponding to the plurality of pointers.

The pointer validation data may be used to detect "use after free" or "double free" logic errors. Detecting use of the first pointer after a deallocation of the chunk (e.g., "use after free" or "double free") may involve receiving a deallocation request to deallocate the memory, wherein the deallocation request comprises the first pointer that points to the chunk of memory. The processing device may access the pointer validation data associated with the chunk of memory and determine the first pointer is invalid in view of the pointer validation data. In one example, determining the first pointer is invalid may involve determining that the pointer validation data indicates an offset is in use and detecting that the first pointer is absent the offset. In another example, determining the first pointer is invalid may involve deriving a virtual memory address from the pointer validation data and comparing the derived virtual memory address with the virtual memory address of the first pointer.

Figure 8:
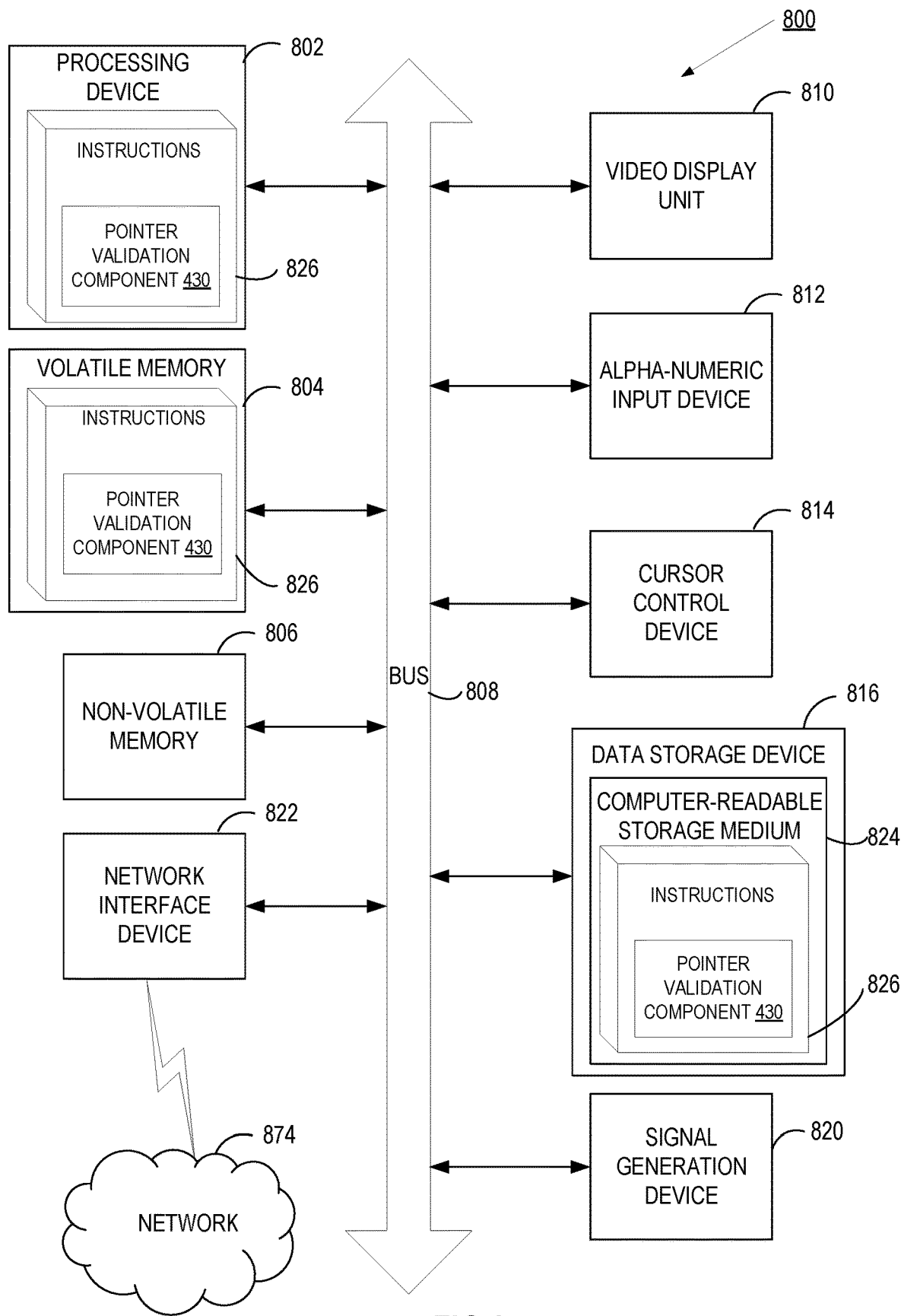
FIG. 8 depicts a block diagram of an illustrative computing device operating in accordance with the examples of the present disclosure.

FIG. 8 depicts a block diagram of a computer system operating in accordance with one or more aspects of the present disclosure. In various illustrative examples, computer system 800 may correspond to computing device 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing methods 500 and 600 and for encoding the pointer validation component 430 illustrated in FIG. 4.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: receiving a plurality of requests to allocate memory, the plurality of requests comprising a first request and a second request; identifying a chunk of memory; generating, by a processing device, a plurality of pointers to the chunk of memory, the plurality of pointers comprising a first pointer and a second pointer; providing the first pointer responsive to the first request and the second pointer responsive to the second request; and updating, by the processing device, pointer validation data after providing the second pointer, wherein the pointer validation data indicates at least one of the plurality of pointers is valid and at least one of the plurality of pointers is invalid.

Example 2 is a method of example 1, wherein the chunk of memory comprises a chunk of physical memory at a specific physical memory address and wherein the plurality of pointers comprise different virtual memory addresses that are mapped to the specific physical memory address.

Example 3 is a method of example 1, further comprising: receiving, from a first thread, the first request to allocate memory and a first request to deallocate the memory, wherein the first request to deallocate the memory comprises the first pointer; receiving, from a second thread, the second request to allocate memory, wherein the second pointer that is provided responsive to the second request is mapped to a same location in the memory as the first pointer; receiving, from the first thread, a second request to deallocate the memory, wherein the second request to deallocate the memory comprises the first pointer; detecting an attempt to double deallocate the memory using the first point; and performing an action in response to the detecting.

Example 4 is a method of example 1, wherein generating the plurality of pointers to the chunk of memory comprises generating the plurality of pointers after identifying the chunk of memory and prior to receiving the second request.

Example 5 is a method of example 1, further comprising: selecting a pointer from the plurality of pointers in response to each request of the plurality of requests; and updating pointer validation data based on the selected pointer.

Example 6 is a method of example 1, wherein generating the plurality of pointers to the chunk of physical memory comprises generating the first pointer responsive to the first request and generating the second pointer responsive to the second request.

Example 7 is a method of example 1, wherein generating the plurality of pointers to the chunk of physical memory comprises: determining a count of an allocation request of the plurality of requests, wherein the count indicates whether the allocation request is an even request or an odd request; identifying a virtual memory address that is available; responsive to the even request, generating a pointer that comprises the virtual memory address; and responsive to the odd request, generating a pointer that comprises a combination of the virtual memory address and an offset.

Example 8 is a method of example 7, wherein the offset comprises a predetermined bit mask and wherein the combination of the virtual memory address and the offset is based on a bitwise operation of the virtual memory address and the predetermined bit mask that sets the highest order bit of the virtual memory address.

Example 9 is a method of example 7, wherein the offset comprises a numeric value and the combination of the virtual memory address and the offset comprises adding or subtracting the numeric value and the virtual memory address.

Example 10 is a method of example 1, further comprising, storing the pointer validation data as a memory tag adjacent to the memory pointed to by the plurality of pointers, wherein the pointer validation data is used to validate the second pointer and comprises one of a boolean value, a counter value, an offset value, or an address value.

Example 11 is a method of example 1, further comprising, storing the pointer validation data in a data structure associated with the chunk of memory, wherein the data structure is stored in a heap of a computing process that initiated the plurality of requests and further comprises a size of the chunk, a physical memory address of the chunk, and a plurality of virtual memory addresses corresponding to the plurality of pointers.

Example 12 is a method of example 1, further comprising detecting use of the first pointer after a deallocation of the chunk, wherein the detecting comprises: receiving a deallocation request to deallocate the memory, wherein the deallocation request comprises the first pointer that points to the chunk of memory; accessing the pointer validation data associated with the chunk of memory; and determining the first pointer is invalid in view of the pointer validation data.

Example 13 is a method of example 12, wherein determining the first pointer is invalid comprises: determining that the pointer validation data indicates an offset is in use; and detecting that the first pointer is absent the offset.

Example 14 is a method of example 12, wherein determining the first pointer is invalid comprises: deriving a virtual memory address from the pointer validation data; and comparing the derived virtual memory address with the virtual memory address of the first pointer.

Example 15. A system comprising: a memory; and a processing device communicably coupled to the memory, the processing device to: receive a plurality of requests to allocate memory, the plurality of requests comprising a first request and a second request; identify a chunk of memory; generate a plurality of pointers to the chunk of memory, the plurality of pointers comprising a first pointer and a second pointer; provide the first pointer responsive to the first request and the second pointer responsive to the second request; and update pointer validation data after providing the second pointer, wherein the pointer validation data indicates at least one of the plurality of pointers is valid and at least one of the plurality of pointers is invalid.

Example 16 is a system of example 15, wherein to generate the plurality of pointers, the processing device is to generate the plurality of pointers after identifying the chunk of memory and prior to receiving the second request.

Example 17 is a system of example 15, wherein to generate the plurality of pointers, the processing device is to generate the first pointer responsive to the first request and generate the second pointer responsive to the second request.

Example 18. A non-transitory machine-readable storage medium storing instructions which, when executed, cause a processing device to perform operations comprising: receiving a plurality of requests to allocate memory, the plurality of requests comprising a first request and a second request; determining a physical memory address of a chunk of physical memory; generating a plurality of virtual memory addresses that map to the physical memory address, the plurality of virtual memory addresses comprising a first virtual memory address and a second virtual memory address; providing the first virtual memory address responsive to the first request and the second virtual memory address responsive to the second request; receiving a request to deallocate the chunk of physical memory, wherein the request to deallocate comprises the first virtual memory address; detecting, in view of pointer validation data, use of the first virtual memory address after the request to deallocate; and performing an action in response to the detecting.

Example 19 is a non-transitory machine-readable storage medium of example 18, wherein the operations further comprise, storing the pointer validation data as a memory tag adjacent to the chunk corresponding to the plurality of virtual memory addresses, wherein the pointer validation data is used to validate the second virtual memory address and comprises one of a boolean value, a counter value, an offset value, or an address value.

Example 20 is a non-transitory machine-readable storage medium of example 18, wherein the operations further comprise, storing the pointer validation data in a data structure associated with the chunk of physical memory, wherein the data structure is stored in a heap of a computing process that initiated the plurality of requests and further comprises a size of the chunk, the physical memory address of the chunk, and the plurality of virtual memory addresses.

Example 21 A process comprising: receiving a plurality of requests to allocate memory, the plurality of requests comprising a first request and a second request; generating a plurality of pointers to a chunk of memory, the plurality of pointers comprising a first pointer and a second pointer; providing the first pointer responsive to the first request and the second pointer responsive to the second request; and updating pointer validation data after providing the second pointer receiving a deallocation request to deallocate the memory, wherein the deallocation request comprises the first pointer that points to the chunk of memory; and determining the first pointer is invalid in view of the pointer validation data.

Example 22 is a process of example 21, wherein determining the first pointer is invalid comprises: determining that the pointer validation data indicates an offset is in use; and detecting that the first pointer is absent the offset.

Example 23 is a process of example 21, wherein determining the first pointer is invalid comprises: deriving a virtual memory address from the pointer validation data; and comparing the derived virtual memory address with the virtual memory address of the first pointer.

Example 24 is a process of example 21, wherein the chunk of memory comprises a chunk of physical memory at a specific physical memory address and wherein the plurality of pointers comprise different virtual memory addresses that are mapped to the specific physical memory address.

Example 25 is a process of example 21, wherein generating the plurality of pointers to the chunk of memory comprises generating the plurality of pointers after identifying the chunk of memory and prior to receiving the second request.

Example 26 is a process of example 21, further comprising: selecting a pointer from the plurality of pointers in response to each request of the plurality of requests; and updating pointer validation data based on the selected pointer.

Example 27 is a process of example 21, wherein generating the plurality of pointers to the chunk of physical memory comprises generating the first pointer responsive to the first request and generating the second pointer responsive to the second request.

Example 28 is a process of example 21, further comprising, storing the pointer validation data as a memory tag adjacent to the memory pointed to by the plurality of pointers, wherein the pointer validation data is used to validate the second pointer and comprises one of a boolean value, a counter value, an offset value, or an address value.

Example 29 is a process of example 21, further comprising, storing the pointer validation data in a data structure associated with the chunk of memory, wherein the data structure is stored in a heap of a computing process that initiated the plurality of requests and further comprises a size of the chunk, a physical memory address of the chunk, and a plurality of virtual memory addresses corresponding to the plurality of pointers.

Example 30. An apparatus comprising: means for receiving a plurality of requests to allocate memory, the plurality of requests comprising a first request and a second request; means for identifying a chunk of memory; means for generating a plurality of pointers to the chunk of memory, the plurality of pointers comprising a first pointer and a second pointer; means for providing the first pointer responsive to the first request and the second pointer responsive to the second request; and means for updating pointer validation data after providing the second pointer, wherein the pointer validation data indicates at least one of the plurality of pointers is valid and at least one of the plurality of pointers is invalid.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving a plurality of requests to allocate memory, the plurality of requests comprising a first request and a second request;
   identifying a chunk of memory;
   generating, by a processing device, a plurality of pointers to the chunk of memory, the plurality of pointers comprising a first pointer and a second pointer;
   determining a count associated with a corresponding request of the plurality of requests, wherein the count indicates whether the corresponding request is an even request or an odd request;
   responsive to the first request, identifying the first pointer based on a first count associated with the first request, wherein the first count indicates the first request is the even request;
   responsive to the second request, identifying the second pointer based on a second count associated with the second request, wherein the second count indicates the second request is the odd request; and
   updating, by the processing device, pointer validation data, wherein the updated pointer validation data indicates validity of the first pointer and the second pointer based on respective counts associated with the first request and the second request.

2. The method of claim 1, wherein the chunk of memory comprises a chunk of physical memory at a specific physical memory address and wherein the plurality of pointers comprise different virtual memory addresses that are mapped to the specific physical memory address.

3. The method of claim 1, further comprising:
receiving, from a first thread, the first request to allocate memory and a first request to deallocate the memory, wherein the first request to deallocate the memory comprises the first pointer;
receiving, from a second thread, the second request to allocate memory, wherein the second pointer that is provided responsive to the second request is mapped to a same location in the memory as the first pointer;
receiving, from the first thread, a second request to deallocate the memory, wherein the second request to deallocate the memory comprises the first pointer;
detecting an attempt to double deallocate the memory using the first pointer; and
performing an action in response to the detecting.

4. The method of claim 1, wherein generating the plurality of pointers to the chunk of memory comprises generating the plurality of pointers after identifying the chunk of memory and prior to receiving the second request.

5. The method of claim 1, further comprising:
selecting a pointer from the plurality of pointers in response to each request of the plurality of requests; and
updating pointer validation data based on the selected pointer.

6. The method of claim 1, wherein generating the plurality of pointers to the chunk of physical memory comprises generating the first pointer responsive to the first request and generating the second pointer responsive to the second request.

7. The method of claim 1, wherein generating the plurality of pointers to the chunk of physical memory comprises:
identifying a virtual memory address that is available;
responsive to the even request, generating a pointer that comprises the virtual memory address; and
responsive to the odd request, generating a pointer that comprises a combination of the virtual memory address and an offset.

8. The method of claim 7, wherein the offset comprises a predetermined bit mask and wherein the combination of the virtual memory address and the offset is based on a bitwise operation of the virtual memory address and the predetermined bit mask that sets the highest order bit of the virtual memory address.

9. The method of claim 7, wherein the offset comprises a numeric value and the combination of the virtual memory address and the offset comprises adding or subtracting the numeric value and the virtual memory address.

10. The method of claim 1, further comprising, storing the pointer validation data as a memory tag adjacent to the memory pointed to by the plurality of pointers, wherein the pointer validation data is used to validate the second pointer and comprises one of a boolean value, a counter value, an offset value, or an address value.

11. The method of claim 1, further comprising, storing the pointer validation data in a data structure associated with the chunk of memory, wherein the data structure is stored in a heap of a computing process that initiated the plurality of requests and further comprises a size of the chunk, a physical memory address of the chunk, and a plurality of virtual memory addresses corresponding to the plurality of pointers.

12. The method of claim 1, further comprising detecting use of the first pointer after a deallocation of the chunk, wherein the detecting comprises:
receiving a deallocation request to deallocate the memory, wherein the deallocation request comprises the first pointer that points to the chunk of memory;
accessing the pointer validation data associated with the chunk of memory; and
determining the first pointer is invalid in view of the pointer validation data.

13. The method of claim 12, wherein determining the first pointer is invalid comprises:
determining that the pointer validation data indicates an offset is in use; and
detecting that the first pointer is absent the offset.

14. The method of claim 12, wherein determining the first pointer is invalid comprises:
deriving a virtual memory address from the pointer validation data; and
comparing the derived virtual memory address with the virtual memory address of the first pointer.

15. A system comprising:
a memory; and
a processing device communicably coupled to the memory, the processing device to:
receive a plurality of requests to allocate memory, the plurality of requests comprising a first request and a second request;
identify a chunk of memory;
generate a plurality of pointers to the chunk of memory, the plurality of pointers comprising a first pointer and a second pointer;
determining a count of an allocation request of the plurality of requests, wherein the count indicates whether the allocation request is an even request or an odd request;
provide the first pointer responsive to the first request and the second pointer responsive to the second request; and
update pointer validation data after providing the second pointer, wherein the pointer validation data indicates, based on the even or odd request indicated in the count of the allocation request of the plurality of requests, at least one of the plurality of pointers is valid and at least one of the plurality of pointers is invalid.

16. The system of claim 15, wherein to generate the plurality of pointers, the processing device is to generate the plurality of pointers after identifying the chunk of memory and prior to receiving the second request.

17. The system of claim 15, wherein to generate the plurality of pointers, the processing device is to generate the first pointer responsive to the first request and generate the second pointer responsive to the second request.

18. A non-transitory machine-readable storage medium storing instructions which, when executed, cause a processing device to perform operations comprising:
receiving a plurality of requests to allocate memory, the plurality of requests comprising a first request and a second request;
determining a physical memory address of a chunk of physical memory;
generating a plurality of virtual memory addresses that map to the physical memory address, the plurality of virtual memory addresses comprising a first virtual memory address and a second virtual memory address;
determining a count of an allocation request of the plurality of requests, wherein the count indicates whether the allocation request is an even request or an odd request;

providing the first virtual memory address responsive to the first request and the second virtual memory address responsive to the second request;

receiving a request to deallocate the chunk of physical memory, wherein the request to deallocate comprises the first virtual memory address;

detecting, in view of pointer validation data, use of the first virtual memory address after the request to deallocate, wherein the pointer validation data indicates, based on the even or odd request indicated in the count of the allocation request, the first virtual memory address is invalid; and performing an action in response to the detecting.

19. The non-transitory machine-readable storage medium of claim 18, wherein the operations further comprise, storing the pointer validation data as a memory tag adjacent to the chunk corresponding to the plurality of virtual memory addresses, wherein the pointer validation data is used to validate the second virtual memory address and comprises one of a boolean value, a counter value, an offset value, or an address value.

20. The non-transitory machine-readable storage medium of claim 18, wherein the operations further comprise, storing the pointer validation data in a data structure associated with the chunk of physical memory, wherein the data structure is stored in a heap of a computing process that initiated the plurality of requests and further comprises a size of the chunk, the physical memory address of the chunk, and the plurality of virtual memory addresses.

* * * * *